(12) United States Patent
Kaiser et al.

(10) Patent No.: US 6,555,262 B1
(45) Date of Patent: Apr. 29, 2003

(54) WICKING STRANDS FOR A POLYMER ELECTROLYTE MEMBRANE

(75) Inventors: Mark Kaiser, Arlington Heights, IL (US); Timothy J. Rehg, Rancho Palos Verdes, CA (US)

(73) Assignee: Hybrid Power Generation Systems, LLC, Los Angeles, CA (US)

(*) Notice: Subject to any disclaimer, the term of this patent is extended or adjusted under 35 U.S.C. 154(b) by 0 days.

(21) Appl. No.: 09/500,413

(22) Filed: Feb. 8, 2000

(51) Int. Cl.[7] .............................. H01M 2/00; H01M 2/02
(52) U.S. Cl. .............................. 429/34; 429/38; 429/39
(58) Field of Search .............................. 429/34, 38, 39

(56) References Cited

U.S. PATENT DOCUMENTS

| | | | |
|---|---|---|---|
| 4,769,297 A | 9/1988 | Reiser et al. | |
| 4,973,530 A | 11/1990 | Vanderborgh et al. | |
| 5,057,368 A | 10/1991 | Largman et al. | |
| 5,234,776 A | * 8/1993 | Koseki | 429/30 |
| 5,262,250 A | 11/1993 | Watanabe | |
| 5,322,744 A | 6/1994 | Koseki | |
| 5,344,721 A | 9/1994 | Sonai et al. | 429/20 |
| 5,358,799 A | 10/1994 | Gardner | |
| 5,390,376 A | * 2/1995 | Marx et al. | 2/406 |
| 5,503,944 A | 4/1996 | Meyer et al. | |
| 5,534,363 A | 7/1996 | Sprouse et al. | |
| 5,573,866 A | 11/1996 | Van Dine et al. | |
| 5,635,039 A | 6/1997 | Cisar et al. | |
| 5,700,595 A | 12/1997 | Reiser | |
| 5,704,966 A | 1/1998 | Rohrback et al. | |
| 5,713,971 A | 2/1998 | Rohrback et al. | |
| 5,759,394 A | 6/1998 | Rohrback et al. | |
| 5,773,160 A | 6/1998 | Wilkinson et al. | |
| 5,776,624 A | 7/1998 | Neutzler | |
| 5,853,909 A | 12/1998 | Reiser | |
| 5,891,221 A | 4/1999 | Rohrbach et al. | |
| 5,916,505 A | 6/1999 | Cisar et al. | |
| 5,952,119 A | * 9/1999 | Wilson | 429/34 |
| 6,117,577 A | * 9/2000 | Wilson | 429/17 |

FOREIGN PATENT DOCUMENTS

| | | |
|---|---|---|
| EP | 0 499 593 A1 | 8/1992 |
| JP | 4-92373 | 3/1992 |
| JP | 4-95356 | 3/1992 |
| JP | 5-283094 | 10/1993 |
| JP | 6-84532 | 3/1994 |
| JP | 6-275284 | 9/1994 |

* cited by examiner

Primary Examiner—Patrick Ryan
Assistant Examiner—Julian Mercado
(74) Attorney, Agent, or Firm—Sutherland Asbill & Brennan LLP

(57) ABSTRACT

In a hydrogen gas fuel cell a polymer electrolyte membrane, or "PEM," is located between two layers composed of a catalyst material such that a sandwich-like assembly is formed. An anode electrode and a cathode electrode, each composed of a thin sheet of porous material that is permeable to liquid and gas, are situated on either side of the sandwich-like assembly such that one surface of each electrode abuts a catalyst layer. The remaining surface of each electrode abuts a conductive nonporous bipolar plate having grooves cut therein. Wicking strands composed of a trilobed fiber are located in between each catalyst layer and the adjacent PEM, and arranged in a repetitive pattern such that the strands do not cross over each other. Each wicking strand abutting the PEM surface facing the anode electrode has one end situated in a reservoir of liquid water. Each wicking strand abutting the PEM surface facing the cathode electrode drains into an exhaust reservoir.

25 Claims, 5 Drawing Sheets

WICKING STRANDS FOR A POLYMER ELECTROLYTE MEMBRANE

BACKGROUND OF THE INVENTION

This invention relates to fuel cells and, more particularly, to fuel cells incorporating a solid polymer electrolyte membrane to conduct protons between the electrodes of the fuel cell and including wicking strands to hydrate the membrane.

Work is commonly derived from fuel by a combustion process which uses the pressure of expanding gases to turn a turbine or move a reciprocating piston and, ultimately, provide torque to a driveshaft. This torque is then usually used for propulsion or to generate electrical power. In the latter case, the electrical power is oftimes reconverted into mechanical work.

The by-products of the combustion process are waste gases which contaminate the atmosphere or, if pollution is to be avoided or at least reduced, reacted with catalysts to produce benign compounds. The foregoing process is usually expensive and typically calls for operations and equipment that require extensive monitoring and maintenance to ensure that the emission of pollutants is kept below a prescribed maximum. Furthermore, there are energy losses inherent in the use of expanding gases to drive a turbine or piston engine due to the inefficiency of the combustion process and friction of moving parts.

One approach which avoids the foregoing disadvantages inherent to generating work by burning a fuel is the fuel cell, which produces electrical power directly from a chemical reaction which oxidizes a fuel with the aid of a catalyst. No intermediate steps, such as combustion, are needed, nor is the machinery to generate electrical power from the torque of a driveshaft. The chemical energy of the fuel is utilized much more efficiently. Since polluting waste gases are not emitted, the attendant processes and equipment required to neutralize these harmful by-products are unnecessary.

The simplest fuel cell consists of two electrodes separated by an electrolyte. The electrodes are electrically connected through an external circuit, with a resistive load lying in between them. Solid polymer electrochemical fuel cells generally employ a membrane electrode assembly, or "MEA," consisting of a solid polymer electrolyte membrane, or "PEM," also known as a proton exchange membrane, disposed between the two electrodes. The electrodes are formed from porous, electrically conductive sheet material, typically carbon fiber paper or cloth, that allows gas diffusion. The PEM readily permits the movement of protons between the electrodes, but is relatively impermeable to gas. It is also a poor electronic conductor, and thereby prevents internal shorting of the cell.

A fuel gas is supplied to one electrode, the anode, where it is oxidized to produce protons and free electrons. The production of free electrons creates an electrical potential, or voltage, at the anode. The protons migrate through the PEM to the other electrode, the positively charged cathode. A reducing agent is supplied to the cathode, where it reacts with the protons that have passed through the PEM and the free electrons that have flowed through the external circuit to form a reactant product. The MEA includes a catalyst, typically platinum-based, at each interface between the PEM and the respective electrodes to induce the desired electrochemical reaction.

In one common embodiment of the fuel cell, hydrogen gas is the fuel and oxygen is the oxidizing agent. The hydrogen is oxidized at the anode to form H$^+$ ions, or protons, and electrons, in accordance with the chemical equation:

$$H_2 = 2H^+ + 2e^-$$

The H$^+$ ions traverse the PEM to the cathode, where they are reduced by oxygen and the free electrons from the external circuit, to form water. The foregoing reaction is expressed by the chemical equation:

$$\tfrac{1}{2}O_2 + 2H^+ + 2e^- = H_2O$$

One class of fuel cells uses a solid PEM formed from an ion exchange polymer such as polyperfluorosulfonic acid, e.g., a Naflon® membrane produced by E. I. DuPont de Nemours. Ion transport is along pathways of ionic networks established by the anionic (sulfonic acid anion) groups that exist within the polymer. Water is required around the ionic sites in the polymer to form conductive pathways for ionic transport.

The ionic conductivity of such PEMs is thus a function of the water content in the polymer. More particularly, the conductivity will decrease as the water content drops below a minimum threshold level. As the conductivity drops, the efficiency of the fuel cell decreases until, if the polymer becomes excessively dry, the fuel cell becomes non-conductive.

There are several factors causing the removal of water from the anode surface of the PEM. Heat generated in the oxidation reaction, as well as by transport of the free electrons, i. e., IR type losses, causes evaporation. Water is also lost through electroosmotic transport by hydrogen water compounds, e.g., "hydronium ions," (H$_3$O)$^+$. This is a process in which water molecules are "dragged" through the PEM by hydrogen protons migrating from the anode to the cathode. Each H$^+$ ion is believed to transport one or two water molecules along with it through the mechanism of electroosmotic "drag."

Dehydration of the membrane is a problem endemic to PEM fuel cells. Abundant water collects on the cathode from being created by the reduction of the H$^+$ ions and from being transported through the PEM by electoosmosis, and some of this water will automatically migrate back through the PEM to the anode by virtue of the mechanism of diffusion. However, the rate of water migrating back to the anode by means of diffusion is not always sufficient to prevent excessive PEM drying under high current operating conditions, and thus diffusion alone cannot be relied upon to prevent drying under the range of operating conditions that a fuel cell might be expected to encounter.

One approach to maintaining adequate hydration of the PEM is to use a humidifier external to the fuel cell structure to introduce water as steam or a fine mist into the stream of hydrogen gas fuel flowing into the anode. Another method is to bubble the fuel gas through water kept at a temperature higher than the temperature at which the fuel cell is operated.

There are, however, limits on the effectiveness of humidification as a viable solution occasioned primarily by constraints inherent to the mechanism of condensation. More particularly, water condenses in the anode in an amount corresponding to the difference between the saturation vapor pressure of the humidified fuel gas at a humidification temperature and the saturation vapor pressure at a cell operation temperature. The difference between the humidification temperature and the cell operation temperature is typically too small to provide for condensation sufficient to avoid excessive dehydration of the PEM.

One solution has been to increase the temperature differential by increasing the humidification temperature. However, the increased humidification temperature causes an increase in the partial pressure of the water vapor which is greater than the attendant increase in the partial pressure of the fuel gas. This unequal increase in partial pressures causes a decrease in the quantity of fuel gas per unit of volume in the humidified gas mixture entering the fuel cell which, in turn, adversely affects the performance of the fuel cell.

Moreover, even with the gaseous mixture being saturated with water in an amount sufficient to prevent dehydration of the PEM, and assuming arguendo that the quantity of condensed water is similarly adequate, the application of the condensed water is not uniform over the surface of the anode. Rather, most of the water condenses on the part of the anode nearest incoming stream, leaving the more distant portions of the PEM subject to drying out.

The quantity of moisture carried by a saturated gas, and thus the amount of condensed water, can be increased by increasing the flow rate of the saturated gas, but this requires a recirculating gas system including recirculation pumps and some means of filtering impurities which tend to accumulate in the unused gas recirculating through the system. A significant drawback to humidifying the fuel gas, and to a recirculation system in particular, is the necessity for pumps, valves, heaters and other equipment which add to the overall cost of the fuel cell in addition to increasing its weight and adversely affecting its reliability.

An alternative to humidifying the fuel gas is to direct a stream of water across the anode. However, as there is no feedback as to the rate the liquid water is being absorbed into the PEM, this approach typically delivers much more liquid water to the anode surface than the quantity being absorbed. This excess of liquid water restricts access of the fuel gas to reaction sites on the anode and consequently has an adverse effect on the performance of the fuel cell.

Wicks also have been used to conduct water from a reservoir to the surface of the anode and PEM. More particularly, U.S. Pat. No. 5,534,363 discloses a wicking structure comprised of hollow tubing having porous walls. The tubing is completely covered by a porous fabric or foam having numerous tiny fabric or foam fingers emanating from the surface of the cover.

The cover adheres to the surface of the fuel cell's anode sheet, and is formed from a material capable of bonding to the porous tube and the anode surface. Thus, the cover material must be selected in view of the material used to form the anode sheet. As noted in column 6, lines 38–46, selecting the proper anode wick materials may require dismantling and analysis of the anode because its physical and chemical characteristics may be a trade secret.

In column 7, lines 13–28, an alternative embodiment discloses a wick comprised of hair shaped tubing formed into the shape of a tree trunk with branches. This tubing is perforated with small holes, and may or may not require porous fabric or foam covers depending upon the wetting characteristics of the anode material and the PEM's hydration requirements. As no alternative mechanism is disclosed to affix this alternative wick structure to the surface of the anode, it is implied that the tubing also must be composed of a material that will bond with the anode sheet.

Another alternative anode wick design replaces the porous fabric or foam fingers with cloth knotted from hydrophilic (i.e., water absorbent) thread and hydrophobic (i.e., water repellent) thread. The knit cloth contains repetitive square hydrophobic regions which substantially exclude all liquid water and allow the passage of hydrogen gas to the anode. Surrounding each hydrophobic region are zones of hydrophilic stripes which exclude hydrogen gas and allow liquid water to be transported via wicking action from the hollow tubing to the anode surface.

As noted, the wicks of the foregoing patent use hollow tubing which lies on the surface of the anode and is affixed thereto by adhesion. It requires an analysis of the anode material because the tubing or tubing cover must be formed from material which will bond with the anode. To use such a wick, various fuel cells must each be dismantled and have their anodes analyzed to ensure proper bonding. A wick must be specially manufactured to be used with each fuel cell having an anode composed of a material having unique bonding characteristics.

U.S. Pat. No. 5,322,744 also discloses a wick to supply water to an anode and, ultimately, to a PEM. More specifically, in column 10, lines 1–4, the patent discloses a wick ". . . made of fine threads of a fibrous material preferably selected from various natural fiber, synthetic fiber or metallic fiber, the fine threads having been twisted together." The twisted threads form a bundle. Any object on the surface of the anode or PEM, such as bundled threads forming a wick, decreases the surface area otherwise available for the transport of $H^+$ ions, and proportionally reduces the current density of the fuel cell. Thus the thicker the bundle, which is obviously thicker than the individual threads, the more the current density is reduced and fuel cell performance compromised.

The water is conducted between the individual fibers forming the bundle along a spiraling, tortuous path, in contradistinction to a linear path. The aforementioned non-linear flow path requires the water molecules to travel a longer path to reach any part of the surface of the anode, particularly with respect to the area of the anode and adjacent PEM lying the furthest distance from the water source for the wicking bundle. This requires more work from the capillary force driving the water molecules and more time for the water to traverse the distance from the water source to the PEM.

U.S. Pat. No. 5,358,799 discloses the use of a capillary wick to conduct water to the anode and from the cathode of a fuel cell. At column 5, lines 59–60, it states that the capillary wicks are comprised of "porous graphite or other suitable materials."

Several references of the prior art disclose a fiber or strand having three hollow interior regions extending axially for the length of the strand, formed by three T-shaped partitions intersecting at the strand's core. In particular, FIG. 3 of U.S. Pat. No. 5,759,394 illustrates the foregoing fiber. The fiber entraps a solid absorbent within the longitudinal regions. The absorbent absorbs undesirable molecules from a passing air stream. Wicking of liquid is not disclosed or suggested.

In U.S. Pat. No. 5,891,221, the aforementioned fiber configuration is shown in FIG. 3 in conjunction with carrying and retaining a liquid having an affinity for undesired odor causing gas phase molecules. The fiber uses capillary action to draw the selected liquid with which it comes into contact through its interior regions. The liquid removes the undesired gas phase molecules from air passing around and through a bundle of the fibers.

FIG. 3 of U.S. Pat. No. 5,704,966 also shows a wicking fiber having the aforementioned trilobed configuration. A bundle of the fibers disclosed therein is used to filter gaseous contaminants from an air stream. Each fiber contains a liquid which captures the gaseous contaminants. The fiber carries the liquid containing the captured contaminants to another air stream which strips them from the fiber and carries them away.

A fiber having the aforementioned trilobed configuration is shown in FIG. 1 of U.S. Pat. No. 5,057,368. At column 5, lines 20–21, liquid wicking is noted as one of its applications. FIG. 5 of U.S. Pat. No. 5,713,971 also shows a trilobed fiber having the aforementioned configuration. At column 4, lines 58–62, this reference discloses using capillary force to wick a liquid up the interior of the fiber. The liquid is to have an affinity for the undesirable material to be removed from an air stream.

The latter four references each discloses a trilobed fiber having a fiber or strand having three hollow interior regions extending axially for the length of the strand. Each of these references notes that the fiber disclosed therein can wick liquid. However, none of them disclose or suggest the use of such a fiber to solve the long standing problem of adequately hydrating the PEM of a gas fuel cell.

As may be seen from the foregoing, there presently exists a need in the art for a hydration apparatus which keeps the PEM of a fuel cell sufficiently hydrated while overcoming the shortcomings, disadvantages and limitations of the prior art. The present invention fulfills this need in the art.

SUMMARY OF THE INVENTION

Briefly, in a fuel cell a PEM is located between two layers composed of a catalyst material such that a sandwich-like assembly is formed. The fuel cell further includes two electrodes, each comprised of a thin sheet of porous material that is permeable to liquid and gas. The two electrodes are situated on either side of the sandwich-like assembly such that one surface of each electrode abuts a catalyst layer.

The remaining surface of each electrode respectively abuts a nonporous bipolar plate. The bipolar plate has grooves for gas flow, and serves as a manifold to distribute fuel gas across the abutting electrode. The two bipolar plates are conductive, and are electrically connected by an external circuit.

Wicking strands are located in between each catalyst layer and the adjacent PEM. Each strand is composed of a trilobed fiber. The strands are arranged in a repetitive pattern such that they do not cross over or overlap each other.

Hydrogen fuel gas flows through the grooves in the anode bipolar plate, diffuses through the anode electrode, and reacts with the catalyst to produce free electrons and $H^+$ ions. The electrons flow to the cathode electrode by means of the external circuit, and the $H^+$ ions migrate through the PEM to the cathode electrode. The wicking strands abutting the PEM surface facing the anode electrode communicate liquid water from a reservoir to the foregoing PEM surface to maintain adequate hydration of the PEM.

Oxygen gas flows through the grooves of the cathode bipolar plate and reacts with the $H^+$ ions and free electrons to form liquid water. The wicking strands abutting the PEM surface facing the cathode electrode communicate liquid water from the surface of the PEM to an exhaust reservoir.

These and other features, aspects and advantages of the present invention will become better understood with reference to the following drawings, description and claims.

DETAILED DESCRIPTION OF THE INVENTION

Figure 1:
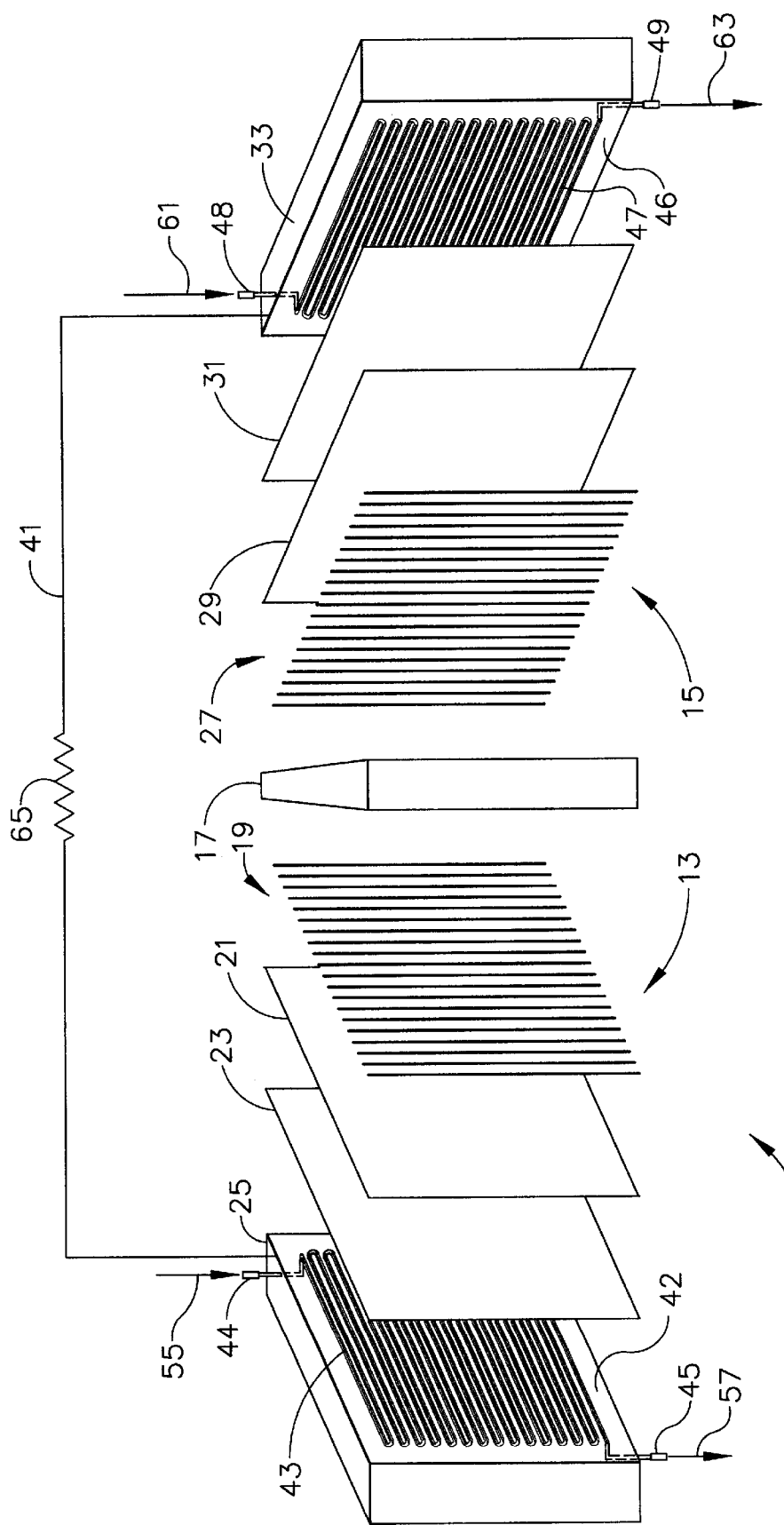
FIG. 1 is an exploded schematic drawing of a fuel cell having a solid PEM and including parallel wicking strands of the present invention.

An exploded view of fuel cell 11 is shown in FIG. 1. Fuel cell 11 is comprised of anode side 13 and cathode side 15, and further includes PEM 17 formed from a solid ion exchange polymer, such as polyperflouorosulfonic acid, e.g., a Naflon® membrane produced by E. I. DuPont de Nemours. PEM 17 separates the two sides electronically, yet provides for the conduction of protons between them, the significance of which will be subsequently explained. Anode side 13 is comprised of wicking strands 19, anode catalyst layer 21, anode electrode 23, and anode bipolar plate 25. Cathode side 15 is comprised of wicking strands 27, cathode catalyst layer 29, cathode electrode 31, and cathode bipolar plate 33.

Catalyst layers 21 and 29 are situated against the two approximately planar faces of PEM 17, respectively, to form a sandwich-like assembly. Catalyst layers 21 and 29 are porous and composed of any one of a number of platinum-based compounds well known to those skilled in the art which precipitate the dissociation of hydrogen gas to form $H^+$ ions and free electrons. Electrodes 23 and 31 are each composed of a thin sheet of porous material that is permeable to liquid and gas. Carbon fiber paper or cloth is commonly used for this purpose.

Figure 2:
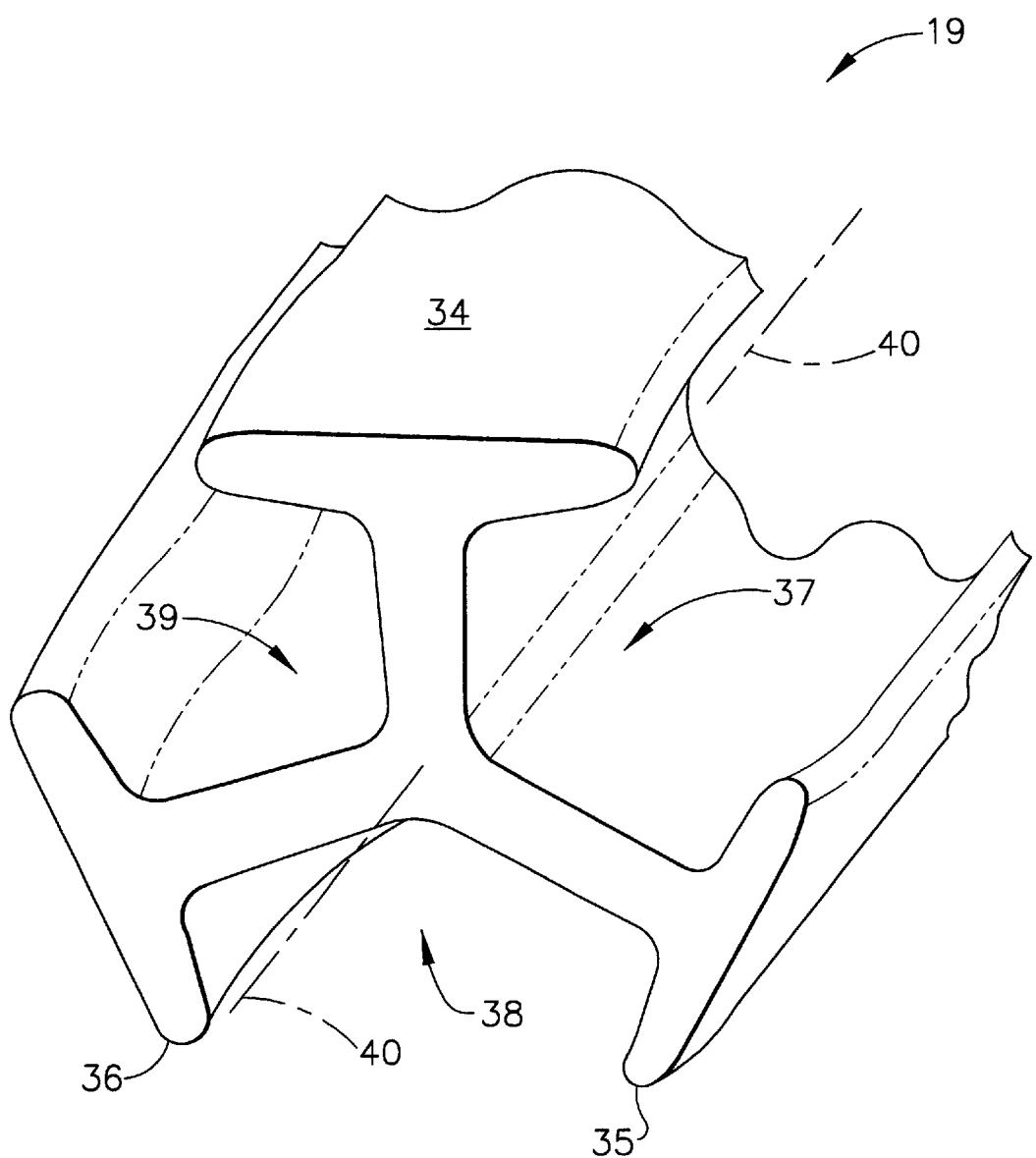
FIG. 2 is a perspective view of a trilobed wicking strand of the present invention.

Strands 19 are situated in between catalyst layer 21 and PEM 17 such that they are in contact with PEM 17 for most of their respective lengths. Strands 27 are situated in between catalyst layer 29 and PEM 17 such that they are in contact with PEM 17 throughout most of their respective lengths. Each of wicking strands 19 and 27 are identical. A perspective view of a singular strand 19 is shown in FIG. 2.

As shown therein, strand 19 includes radially projecting lobes 34, 35 and 36. Each pair of lobes forms a channel between them for the flow of water. More particularly, channel 37 is formed between lobes 34 and 35, channel 38 is formed between lobes 35 and 36, and channel 39 is formed between lobes 34 and 36.

Water is conducted along axial axis 40 of strand 19 through channels 37, 38, and 39. For example, water molecules flowing through channel 37 are restrained from moving transversely by lobes 34 and 35. Instead, the path of least resistance is axial flow along channel 37. The capillary force acting on the fluid water forces it to flow axially within channel 37 until channel 37-abuts an area of PEM 17 where the local absence of water creates a capillary force sufficient to overcome the surface tension on the water surface lying between lobes 34 and 35, and force the water in channel 37 to move transversely to axial axis 40 and onto the abutting surface of PEM 17.

The transverse flow of water from channel 37 onto the abutting surface of PEM 17 continues until the surface is sufficiently hydrated to reach an equivalent chemical potential which, in combination with lobes 34 and 35, restrains the transverse movement of water, and causes it to continue moving axially until channel 37 again abuts a dry surface area of PEM 17. The same mechanism functions with respect to water flowing through channels 38 and 39.

Although strand 19 will twist as it traverses the surface of PEM 17, the presence of three parallel axial channels ensures that at least one of the channels will almost always abut PEM 17 and conduct water to various areas of it as previously described.

Each of strands 27 function in a similar manner to conduct water away from the surface of PEM 17. The Triad™ fiber produced by Honeywell International, Inc. has the preferred trilobed cross section shown in FIG. 2, and thus is suitable for use as strands 19 and 27.

Strands 19 are preferably arranged in a repetitive pattern. This allows the surface of PEM 17 to be adequately hydrated using only the minimum lengths of strands 19 required. Avoiding unnecessary lengths of strands 19 minimizes the surface area of PEM 17 covered by strands 19, and thereby obstructed and rendered unusable for the transmission of $H^+$ ions.

Preferably, strands 19 should not cross over or otherwise overlap each other because only the overlapped section of strand 19 abutting PEM 17 would function as intended to conduct water to the abutting surface of PEM 17. The overlapping section of strand 19 not abutting PEM 17, that is, lying in between the underlying strand and catalyst layer 21, would be unable to conduct water to PEM 17 at that location because conduction depends on contact with a dry surface area, and the underlying strand would be hydrated. The overlying strand would thus only add to the length of the strand necessary to adequately hydrate PEM 17.

Strands 27 are preferably arranged in a repetitive pattern without overlapping for the same reasons. As shown in FIG. 1, strands 19 and 27 are disposed parallel to each other, with the respective spacing between each pair of adjacent strands being approximately equal.

Bipolar plates 25 and 33 are formed from conductive nonporous material that is imperious to gas and liquid. Electrical circuit 41 electrically connects bipolar plates 25 and 33. Anode bipolar plate 25 includes face 42, parallel grooves 43, inlet 44 and exhaust 45. Grooves 43 are cut into otherwise planar face 42. Grooves 43 fluidly communicate with each other, with inlet 44, and with exhaust 45. Anode bipolar plate 25 abuts anode electrode 23 such that anode electrode 23 is exposed to grooves 43 and any gas flowing therethrough.

Cathode bipolar plate 33 includes face 46, parallel grooves 47, inlet 48 and exhaust 49. Grooves 47 are cut into otherwise planar face 46. Grooves 47 fluidly communicate with each other, with inlet 48, and with exhaust 49. Cathode bipolar plate 33 abuts cathode electrode 31 such that cathode electrode 31 is exposed to grooves 47 and any gas flowing therethrough.

Figure 3:
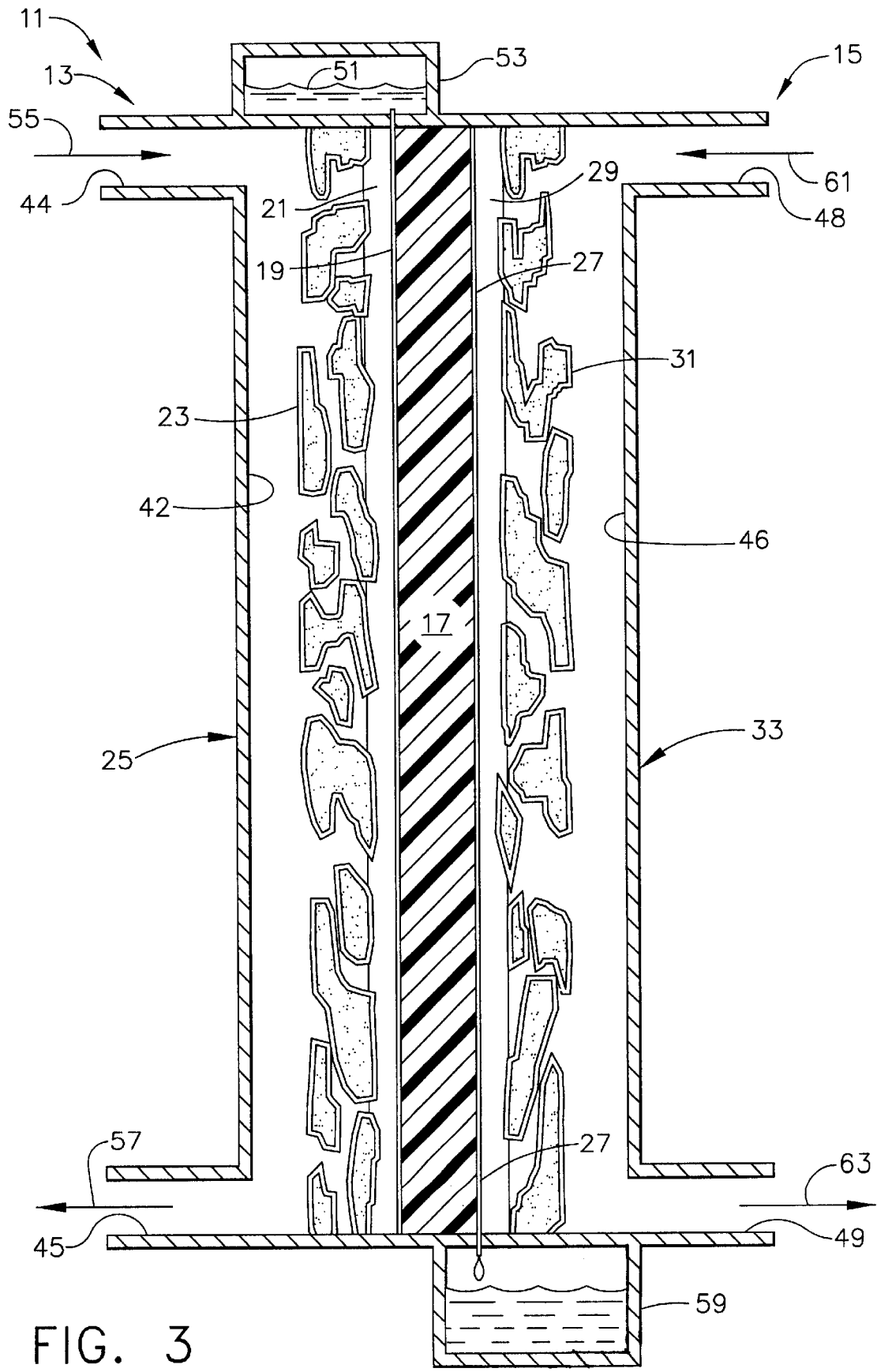
FIG. 3 is a schematic drawing depicting a sectioned side view of a fuel cell having a PEM and including the wicking strands of the present invention.
Figure 4:
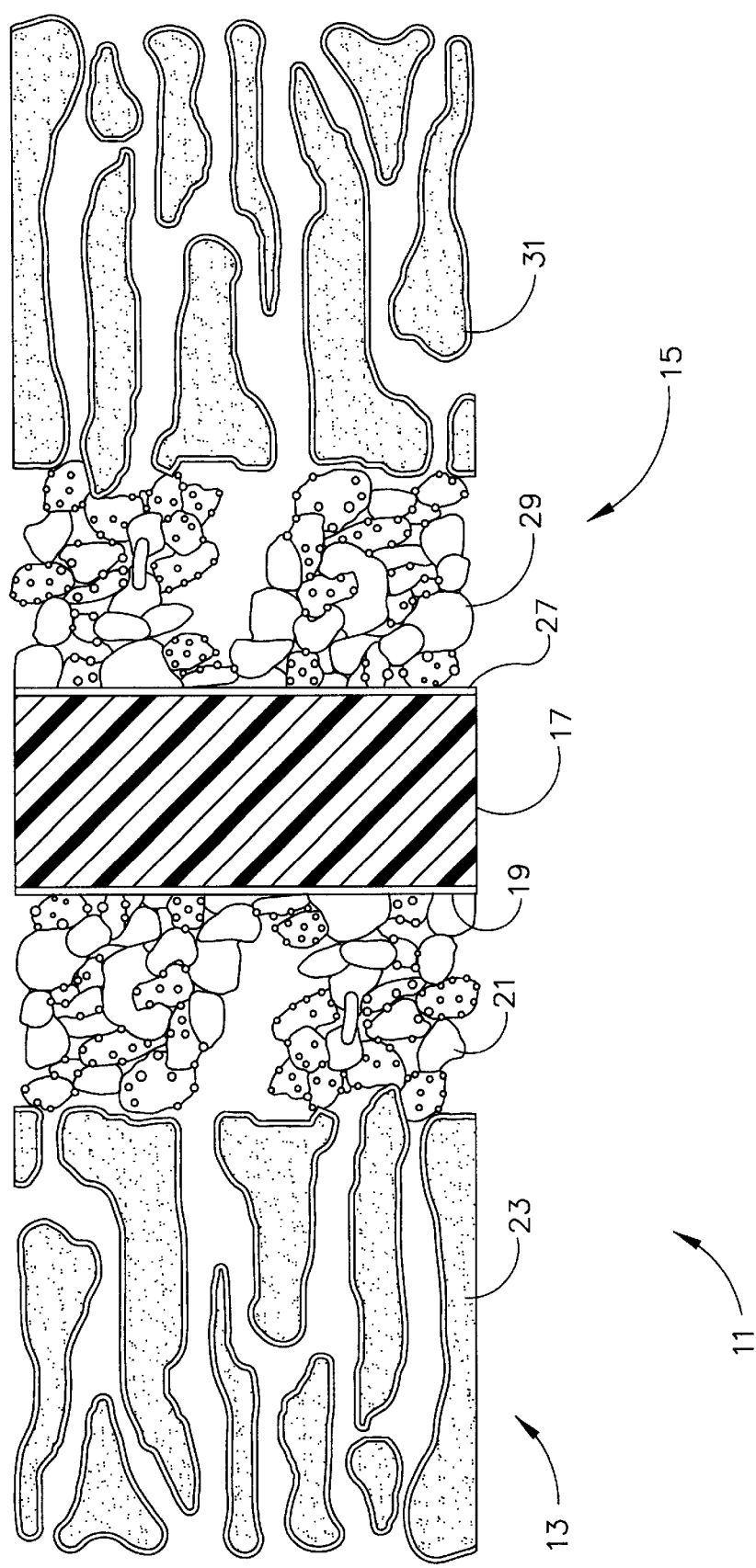
FIG. 4 is a schematic drawing showing a fragmentary, enlarged sectioned side view of a fuel cell having a PEM and including the wicking strands of the present invention.

FIG. 3 is a schematic cross sectional view of fuel cell 11. FIG. 4 is a fragmentary, enlarged cross sectional view of fuel cell 11. As particularly shown in FIG. 3, strands 19 communicate with water 51 in water reservoir 53, inlet 44 fluidly communicates with hydrogen fuel gas 55 from a hydrogen gas source (not shown), and exhaust 45 fluidly communicates exhaust gas 57 with an exhaust reservoir (not shown). The pressure of the hydrogen gas source is maintained at a pressure sufficiently greater than that of the exhaust reservoir to ensure fluid flow from the hydrogen gas source, through grooves 43 (not shown in FIG. 3), and into the exhaust reservoir. The pressure in water reservoir 53 is maintained at a level slightly greater than the pressure in grooves 43 to prevent or reduce the leakage of hydrogen fuel gas 55 into water reservoir 53.

With respect to cathode side 15 of fuel cell 11, strands 27 communicate with water reservoir 59, inlet 48 fluidly communicates with oxygen gas 61 from a oxygen gas source (not shown), and exhaust 49 fluidly communicates exhaust gas 63 with an exhaust reservoir (not shown). The pressure of the oxygen gas source is maintained at a pressure greater than the pressure in the exhaust reservoir to ensure the fluid flow of oxygen gas 61 through grooves 47.

Upon flowing into grooves 43, hydrogen fuel gas 55 flows through anode electrode 23 and comes into contact with catalyst layer 21, whereupon it dissociates to form $H^+$ ions and free electrons in accordance with the following equation:

$$H_2 = 2H^+ + 2e^-$$

The generation of free electrons creates a voltage between anode bipolar plate 25 and cathode bipolar plate 33. Circuit 41 includes load 65. When load 65 is powered by the foregoing voltage, circuit 41 is closed and current flows to cathode bipolar plate 33.

As PEM 17 dehydrates due to evaporation and electroosmotic transport, water 51 is drawn from water reservoir 53 through strands 19 and onto the face of the anode side of PEM 17 by capillary action. Equilibrium between strands 19 and PEM 17 is maintained by capillary action to keep PEM 17 hydrated. Conversely, should PEM 17 become saturated with moisture, the driving force of the capillary action will subside and abate the conduction of water 51 onto PEM 17.

The $H^+$ protons traverse PEM 17 to cathode electrode 31 where, precipitated by catalyst layer 29, they are reduced by oxygen gas 61 and the free electrons conducted by circuit 41 from anode bipolar plate 25, to form water. The foregoing reaction is expressed by the chemical equation:

$$\tfrac{1}{2}O_2 + 2H^+ + 2e^- = H_2O$$

Excess water is removed from PEM 17 through strands 27 and into water reservoir 59 by capillary action.

The other face of anode bipolar plate 25 may abut the cathode of an adjacent fuel cell. In such a configuration, this face would have the grooves, oxygen gas inlet, and exhaust heretofore described in conjunction with cathode bipolar plate 33, and it would function in an identical manner. Such a plate is called a bipolar plate because it abuts the anode electrode of one fuel cell and the cathode electrode of an adjacent fuel cell. The adjacent fuel cells are electrically connected in series. This is known as a "stacked" fuel cell configuration.

Figure 5:
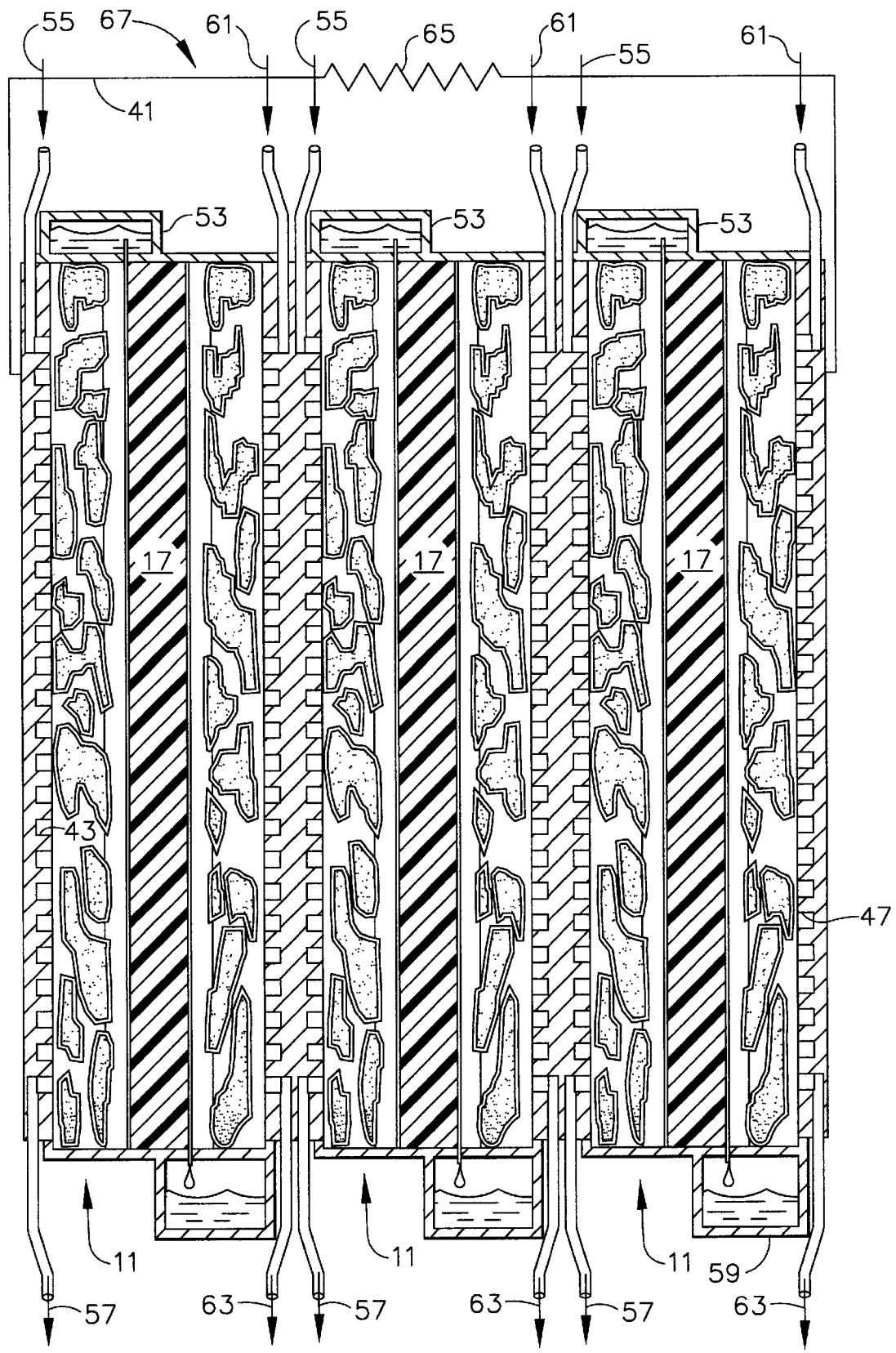
FIG. 5 is a schematic drawing depicting a sectioned side view of several fuel cells, each having a PEM and incorporating the wicking strands of the present invention, in a stacked configuration.

Further stacking could be obtained by adding another adjacent fuel cell in abutment to cathode bipolar plate 33. FIG. 5 shows three fuel cells 11 of the present invention in stacked configuration 67.

The present invention is a fuel cell which uses capillary wicking strands to provide water when the hydration level of the anode side of the PEM is too low and in danger of drying out, and remove excess water from the cathode side of the PEM. It accomplishes the foregoing without limiting or adversely affecting the performance of the fuel cell. As the present invention ensures proper hydration without the extensive equipment required to humidify the hydrogen fuel gas or recirculate humidified hydrogen fuel gas, it realizes improved reliability, decreased maintenance, reduced weight, and cost savings over the apparatus of the prior art.

Furthermore, the wicking strands of the present invention do not need to be bonded to the anode or cathode, respectively, or to the PEM, and thus no analysis of the composition of the foregoing fuel cell components is necessary because the wicking strands need not be composed of a material capable of bonding to the foregoing components.

The wicking strands of the present invention may be used with fuel cell electrodes and PEMs composed of virtually any material.

Moreover, each of the wicking strands of the present invention are composed of a singular fiber of wicking material. The water being conducted flows along a nearly linear path that is shorter that the tortuous path required by prior art wicks composed of bundled fibers. The capillary force necessary to move water through this nearly linear path is less than for the tortuous path of the prior art. On the anode side of the PEM, this allows the present invention to respond more quickly to a dry PEM and respond when the hydration level is lower compared to the bundled fiber wicks of the prior art. On the cathode side of the PEM, this allows the present invention to respond more quickly to a wet PEM and respond when the hydration level is higher compared to the bundled fibers of the prior art.

The singular fiber composing each of wicking strands of the present invention is substantially narrower than the bundled fiber wicks of the prior art, yet conducts water at a higher flow rate. Moreover, the wicking strands of the present invention are not covered by a porous fabric or foam. The wicking strands of the present invention thus obstruct less of the surface area of the PEM than the wicks of the prior art, and thereby leave more area available for the transmission of $H^+$ ions. This increases the current density and enhances the performance of the fuel cell.

It should be understood, of course, that the foregoing relates to preferred embodiments of the invention and that modifications may be made without departing from the spirit and scope of the invention as set forth in the following claims.

We claim:

1. An apparatus for hydrating a polymer electrolyte membrane in a fuel cell, comprising:
    a wicking strand for conducting water by capillary action between said polymer electrolyte membrane and a location apart from said polymer electrolyte membrane, wherein said wicking strand abuts said polymer electrolyte membrane;
    said strand having symmetrical lobes; and
    partially enclosed channels being formed between adjacent symmetrical lobes, whereby water is conducted by said strand by having it flow through said partially enclosed channels.

2. The hydrating apparatus as defined in claim 1 wherein:
    said strand has an axial axis of symmetry;
    said lobes extend radially from said axis; and
    each lobe including an arm having a distal end and a flange attached to said distal end.

3. The hydration apparatus as defined in claim 2 wherein the number of said channels is equal to the number of said lobes.

4. The hydration apparatus as defined in claim 3 wherein said lobes are comprised of at least three lobes.

5. The hydration apparatus as defined in claim 4 wherein:
    said strand is comprised of a plurality of strands; and
    said strands form a repetitive pattern on the membrane.

6. The hydration apparatus as defined in claim 5 wherein:
    the fuel cell includes a catalyst layer; and
        said strands are located in between the catalyst layer and the membrane.

7. The hydration apparatus as defined in claim 6 wherein said pattern is comprised of said strands being situated parallel to one another.

8. The hydration apparatus as defined in claim 6 wherein the membrane is a polymer electrolyte.

9. The hydration apparatus as defined in claim 6 wherein said channels are for conducting water from the location apart from said membrane to said membrane.

10. The hydration apparatus as defined in claim 6 wherein said channels are for removing water from the membrane to the location apart from the membrane.

11. The hydration apparatus as defined in claim 6 wherein the fuel cell uses a fuel comprised of hydrogen gas.

12. The hydration apparatus as defined in claim 4 wherein:
    the fuel cell includes an anode catalyst layer;
    the membrane includes an anode-side surface;
    said strand lies in between and abuts the anode catalyst layer and the anode-side surface;
    the location including a reservoir for containing a volume of water; and
    said strand communicates with the reservoir, whereby water flows from the reservoir, through said strand, and onto the anode-side surface.

13. The hydration apparatus as defined in claim 12 wherein:
    said strand is comprised of a plurality of strands; and
    said strands form a repetitive pattern.

14. The hydration apparatus as defined in claim 13 wherein:
    the fuel cell includes an anode electrode; and
    the anode electrode abuts the anode catalyst layer.

15. The hydration apparatus as defined in claim 14 wherein:
    the fuel cell includes an anode bipolar plate and a fuel source; and
    the anode bipolar plate includes anode manifold means for fluidly communicating the fuel source with the anode electrode.

16. The hydration apparatus as defined in claim 4 wherein:
    the fuel cell includes a cathode catalyst layer;
    the membrane includes a cathode-side surface; and
    said strand lies in between and abuts the cathode catalyst layer and the cathode-side surface, whereby water is removed from the cathode-side surface of the membrane to the location.

17. The hydration apparatus as defined in claim 16 wherein:
    said strand is comprised of a plurality of strands; and
    said strands form a repetitive pattern.

18. The hydration apparatus as defined in claim 17 wherein:
    the fuel cell includes a cathode electrode; and
    the cathode electrode abuts the cathode catalyst layer.

19. The hydration apparatus as defined in claim 18 wherein:
    the fuel cell includes a cathode bipolar plate and a reduction gas source; and
    the cathode bipolar plate includes cathode manifold means for fluidly communicating the reduction gas source with the cathode electrode.

20. An apparatus for hydrating a membrane in a fuel cell comprising:
    a membrane having two major sides, an anode-facing side and a cathode-facing side;
    an anode catalyst layer lying adjacent said anode-facing side;

a wicking strand for conducting water, with said wicking strand abutting said anode-facing side of said membrane and abutting said anode catalyst layer; and an anode electrode abutting said anode catalyst layer.

21. The hydration apparatus defined in claim 20 wherein:

said wicking strand is comprised of a single strand of wicking material; and said strand has a cross section having three lobes.

22. The hydration apparatus defined in claim 21 further comprising:

three channels being formed by said lobes, whereby water is conducted by said strand by means of having it flow through said channels.

23. The hydration apparatus as defined in claim 22 wherein:

said strand has an axial axis of symmetry;

said lobes extend radially from said axis; and each lobe includes arm having a distal end and a flange attached to said distal end.

24. The hydration apparatus defined in claim 23 further comprising:

a cathode catalyst layer lying adjacent the cathode-facing side;

said strand being located in between and abutting the cathode-facing side and the cathode catalyst layer, and a cathode electrode abutting the cathode catalyst layer, whereby water is removed from the cathode-facing side of the membrane.

25. The hydration apparatus defined in claim 23 further comprising a reservoir for containing a volume of water, wherein:

said strand is situated in between and abutting the anode-facing side and the anode catalyst layer; and said strand communicates with the reservoir, whereby water is conducted to the anode-facing side of the membrane.

* * * * *